(12) United States Patent
Peuhkurinen et al.

(10) Patent No.: US 11,508,085 B2
(45) Date of Patent: Nov. 22, 2022

(54) DISPLAY SYSTEMS AND METHODS FOR ALIGNING DIFFERENT TRACKING MEANS

(71) Applicant: Varjo Technologies Oy, Helsinki (FI)

(72) Inventors: Ari Antti Peuhkurinen, Helsinki (FI); Aleksei Romanov, Vantaa (FI); Evgeny Zuev, Helsinki (FI); Yuri Popov, Helsinki (FI); Tomi Lehto, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 120 days.

(21) Appl. No.: 16/869,933

(22) Filed: May 8, 2020

(65) Prior Publication Data

US 2021/0350564 A1 Nov. 11, 2021

(51) Int. Cl.
*G06T 7/70* (2017.01)
*G06T 7/593* (2017.01)
*G06F 3/01* (2006.01)
*G06T 11/00* (2006.01)

(52) U.S. Cl.
CPC ............... *G06T 7/70* (2017.01); *G06F 3/011* (2013.01); *G06T 7/593* (2017.01); *G06T 11/00* (2013.01); *G06T 2207/10012* (2013.01); *G06T 2207/10028* (2013.01); *G06T 2207/30196* (2013.01)

(58) Field of Classification Search
CPC . G06T 7/70; G06T 7/593; G06T 11/00; G06T 2207/10012; G06T 2207/10028; G06T 2207/30196; G06F 3/011
See application file for complete search history.

(56) References Cited

U.S. PATENT DOCUMENTS

| 2002/0140812 | A1* | 10/2002 | Martins ............... G06T 7/20 348/169 |
| 2009/0231272 | A1* | 9/2009 | Rogowitz ........... G06F 3/04815 345/156 |
| 2012/0194517 | A1* | 8/2012 | Izadi .................. G06F 3/011 345/420 |
| 2018/0039079 | A1 | 2/2018 | Lin et al. |
| 2019/0025588 | A1* | 1/2019 | Osterhout ............. H04N 5/232 |

(Continued)

OTHER PUBLICATIONS

European Patent Office, Extended Search Report, Application No. 21168831.2, dated Oct. 14, 2021, 9 pages.

*Primary Examiner* — Terrell M Robinson
(74) *Attorney, Agent, or Firm* — Ziegler IP Law Group, LLC

(57) ABSTRACT

A display system including: display apparatus; display-apparatus-tracking means; input device; processor. The processor is configured to: detect input event and identify actionable area of input device; process display-apparatus-tracking data to determine pose of display apparatus in global coordinate space; process first image to identify input device and determine relative pose thereof with respect to display apparatus; determine pose of input device and actionable area in global coordinate space; process second image to identify user's hand and determine relative pose thereof with respect to display apparatus; determine pose of hand in global coordinate space; adjust poses of input device and actionable area and pose of hand such that adjusted poses align with each other; process first image, to generate extended-reality image in which virtual representation of hand is superimposed over virtual representation of actionable area; and render extended-reality image.

18 Claims, 6 Drawing Sheets

(56) References Cited

U.S. PATENT DOCUMENTS

2019/0068529 A1\* 2/2019 Mullins ................. H04L 51/043
2019/0188474 A1 6/2019 Zahnert et al.
2020/0387745 A1\* 12/2020 Ulbricht .................... G06T 7/70

\* cited by examiner

DISPLAY SYSTEMS AND METHODS FOR ALIGNING DIFFERENT TRACKING MEANS

TECHNICAL FIELD

The present disclosure relates generally to calibration of tracking equipment; and more specifically, to display systems for aligning different tracking means, said display systems comprising display apparatuses, display-apparatus-tracking means, input devices, and processors. Moreover, the present disclosure also relates to methods for aligning different tracking means.

BACKGROUND

Extended-reality (XR) devices, in operation, present XR environments to users. The users typically interact with the XR environments using input devices (for example, such as keyboards, XR controllers, joysticks, and the like). When using the XR devices, the users are positioned within real-world environments. The real-world environments include therein the XR devices, the users, the input devices, as well as other objects (for example, such as people, furniture, plants, animals, decorative items, and the like).

XR applications need to know at least poses of the XR devices, the input devices and the users within real-world environments continuously, so as to be able to realistically represent virtual content in the XR environments. Accurate estimation of all these poses and proper alignment of all these poses with respect to each other is very important, because any erroneous estimates result in an incorrect representation of the virtual content in the XR environments. For example, let us consider an input event when a user presses a given key on a keyboard when interacting with an XR game presented at an XR device. If a pose of the user's hand and/or a pose of the keyboard and the given key is inaccurate and/or misaligned with the other, a virtual representation of the user's hand would appear to be mismatched with respect to a virtual representation of the given key. In other words, the user's hand would virtually appear to be pressing some other key on the keyboard, instead of appearing to press the given key. Such incorrect visualization of the input event would be immediately visible to the user, thereby breaking the user's immersion in the XR game. As the XR applications rely on tracking data obtained from different tracking systems used to track poses of different elements/entities in the real-world environment, it is imperative that pose estimation and mutual alignment for the different elements/entities is performed accurately.

There exist several conventional techniques for pose estimation and mutual pose alignment for the different elements/entities being tracked. These conventional techniques are suboptimal and often yield undesirable results. Firstly, each tracking system has various sources of error and therefore, is unable to unable to track the pose of its corresponding device/entity accurately. Erroneous tracking data yields incorrect pose estimates, which is undesirable for the MR applications. For example, when an input device pose that is inaccurate or drifts from an actual input device pose is used by the MR applications, a visual representation of the input device in the MR environments is unrealistic.

Secondly, each tracking system tracks the pose of its corresponding device/entity in its own frame of reference within the real-world environment. Aligning tracked poses in different frames of reference to a single frame of reference is quite complex, and is prone to errors and challenges. In an example, some tracking systems (for example, such as camera-based tracking systems) are more reliable as compared to other tracking systems (for example, such as magnetic tracking systems). When pose alignment is performed using poses tracked by lesser-reliable tracking systems as reference, poses tracked by more-reliable tracking systems are also compromised. In another example, use of old tracking data at a time of the aforesaid pose alignment introduces errors in said alignment. In yet another example, manual calibration used to calibrate the different tracking systems for aligning their tracked poses is cumbersome, inaccurate, and inefficient.

Therefore, in light of the foregoing discussion, there exists a need to overcome the aforementioned drawbacks associated with pose estimation of and pose alignment between multiple pose tracking systems in a real-world environment.

SUMMARY

The present disclosure seeks to provide a display system. The present disclosure also seeks to provide a method. The present disclosure seeks to provide a solution to the existing problems of inaccurate pose determination by and improper pose alignment between multiple pose tracking systems. An aim of the present disclosure is to provide a solution that overcomes at least partially the problems encountered in prior art, and provides a display system that employs multiple tracking systems for accurately tracking poses of multiple devices/entities, whilst also mutually aligning the tracked poses with respect to each other in an accurate manner for generating realistic and immersive extended-reality environments.

In one aspect, an embodiment of the present disclosure provides a display system comprising:
  a display apparatus comprising at least one image renderer and at least one camera;
  display-apparatus-tracking means;
  at least one input device associated with the display apparatus; and
  at least one processor configured to:
  detect an occurrence of a given input event at a given input device and identify an actionable area of the given input device using which a user provided an input pertaining to the given input event;
  process display-apparatus-tracking data, obtained from the display-apparatus-tracking means, to determine a pose of the display apparatus during the given input event, wherein the pose of the display apparatus is determined in a global coordinate space;
  process at least one first image of a real-world environment, captured by the at least one camera, to identify the given input device in the real-world environment and to determine a relative pose of the given input device and the identified actionable area with respect to the display apparatus during the given input event;
  determine a pose of the given input device and the identified actionable area during the given input event in the global coordinate space, based on the relative pose of the given input device and the identified actionable area with respect to the display apparatus and the pose of the display apparatus during the given input event;
  process at least one second image of the real-world environment, captured by the at least one camera, to identify a hand of the user and to determine a relative pose of the hand with respect to the display apparatus during the given input event;

determine a pose of the hand during the given input event in the global coordinate space, based on the relative pose of the hand with respect to the display apparatus and the pose of the display apparatus during the given input event;

adjust the pose of the given input device and the identified actionable area and the pose of the hand in a manner that the adjusted pose of the hand aligns with the adjusted pose of the identified actionable area;

process the at least one first image, based on the adjusted pose of the given input device and the identified actionable area and the adjusted pose of the hand, to generate at least one extended-reality image in which a virtual representation of the hand is superimposed over a virtual representation of the identified actionable area of the given input device; and render the at least one extended-reality image via the at least one image renderer of the display apparatus.

In another aspect, an embodiment of the present disclosure provides a method comprising:

detecting an occurrence of a given input event at a given input device associated with a display apparatus and identifying an actionable area of the given input device using which a user provided an input pertaining to the given input event;

processing display-apparatus-tracking data to determine a pose of the display apparatus during the given input event, wherein the pose of the display apparatus is determined in a global coordinate space;

processing at least one first image of a real-world environment to identify the given input device in the real-world environment and to determine a relative pose of the given input device and the identified actionable area with respect to the display apparatus during the given input event;

determining a pose of the given input device and the identified actionable area during the given input event in the global coordinate space, based on the relative pose of the given input device and the identified actionable area with respect to the display apparatus and the pose of the display apparatus during the given input event;

processing at least one second image of the real-world environment to identify a hand of the user and to determine a relative pose of the hand with respect to the display apparatus during the given input event;

determining a pose of the hand during the given input event in the global coordinate space, based on the relative pose of the hand with respect to the display apparatus and the pose of the display apparatus during the given input event;

adjusting the pose of the given input device and the identified actionable area and the pose of the hand in a manner that the adjusted pose of the hand aligns with the adjusted pose of the identified actionable area;

processing the at least one first image, based on the adjusted pose of the given input device and the identified actionable area and the adjusted pose of the hand, to generate at least one extended-reality image in which a virtual representation of the hand is superimposed over a virtual representation of the identified actionable area of the given input device; and rendering the at least one extended-reality image via the display apparatus.

Embodiments of the present disclosure substantially eliminate or at least partially address the aforementioned problems in the prior art, and enable accurate pose tracking and automatic calibration of multiple tracking systems associated with an extended-reality display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3A illustrates a top view of two coordinate spaces of two cameras in a real-world environment, the two cameras comprising a first camera for capturing a first image and a second camera for capturing a second image, while

Figure 1:
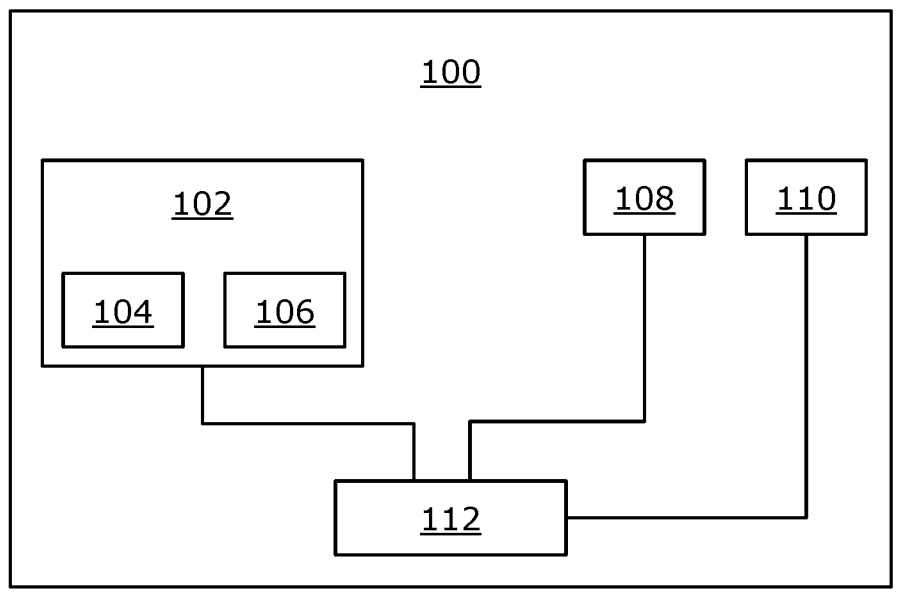
FIGS. 1 and 2 illustrate block diagrams of architectures of a display system, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display system comprising:

a display apparatus comprising at least one image renderer and at least one camera;

display-apparatus-tracking means;

at least one input device associated with the display apparatus; and at least one processor configured to:
detect an occurrence of a given input event at a given input device and identify an actionable area of the given input device using which a user provided an input pertaining to the given input event;
process display-apparatus-tracking data, obtained from the display-apparatus-tracking means, to determine a pose of the display apparatus during the given input event, wherein the pose of the display apparatus is determined in a global coordinate space;
process at least one first image of a real-world environment, captured by the at least one camera, to identify the given input device in the real-world environment and to determine a relative pose of the given input device and the identified actionable area with respect to the display apparatus during the given input event;
determine a pose of the given input device and the identified actionable area during the given input event in the global coordinate space, based on the relative pose of the given input device and the identified actionable area with respect to the display apparatus and the pose of the display apparatus during the given input event;
process at least one second image of the real-world environment, captured by the at least one camera, to identify a hand of the user and to determine a relative pose of the hand with respect to the display apparatus during the given input event;
determine a pose of the hand during the given input event in the global coordinate space, based on the relative pose of the hand with respect to the display apparatus and the pose of the display apparatus during the given input event;
adjust the pose of the given input device and the identified actionable area and the pose of the hand in a manner that the adjusted pose of the hand aligns with the adjusted pose of the identified actionable area;
process the at least one first image, based on the adjusted pose of the given input device and the identified actionable area and the adjusted pose of the hand, to generate at least one extended-reality image in which a virtual representation of the hand is superimposed over a virtual representation of the identified actionable area of the given input device; and
render the at least one extended-reality image via the at least one image renderer of the display apparatus.

In another aspect, an embodiment of the present disclosure provides a method comprising:
detecting an occurrence of a given input event at a given input device associated with a display apparatus and identifying an actionable area of the given input device using which a user provided an input pertaining to the given input event;
processing display-apparatus-tracking data to determine a pose of the display apparatus during the given input event, wherein the pose of the display apparatus is determined in a global coordinate space;
processing at least one first image of a real-world environment to identify the given input device in the real-world environment and to determine a relative pose of the given input device and the identified actionable area with respect to the display apparatus during the given input event;
determining a pose of the given input device and the identified actionable area during the given input event in the global coordinate space, based on the relative pose of the given input device and the identified actionable area with respect to the display apparatus and the pose of the display apparatus during the given input event;
processing at least one second image of the real-world environment to identify a hand of the user and to determine a relative pose of the hand with respect to the display apparatus during the given input event;
determining a pose of the hand during the given input event in the global coordinate space, based on the relative pose of the hand with respect to the display apparatus and the pose of the display apparatus during the given input event;
adjusting the pose of the given input device and the identified actionable area and the pose of the hand in a manner that the adjusted pose of the hand aligns with the adjusted pose of the identified actionable area;
processing the at least one first image, based on the adjusted pose of the given input device and the identified actionable area and the adjusted pose of the hand, to generate at least one extended-reality image in which a virtual representation of the hand is superimposed over a virtual representation of the identified actionable area of the given input device; and
rendering the at least one extended-reality image via the display apparatus.

The present disclosure provides the aforementioned display system and the aforementioned method. The display system disclosed herein enables accurate pose estimation of the display apparatus, the given input device and the hand of the user, whilst also mutually aligning accurately their poses in the global coordinate space. In particular, the poses of the given input device and the identified actionable area and the hand are adjusted precisely by the at least one processor to ensure that the adjusted pose of the hand aligns with the adjusted pose of the identified actionable area. When the at least one extended-reality (XR) image is generated using these adjusted poses, the virtual representation of the hand is superimposed (namely, placed) accurately over the virtual representation of the identified actionable area, to realistically mimic occurrence of the given input event in the at least one XR image. Therefore, the user of the display apparatus is provided with an immersive experience of an XR environment.

It will be appreciated that in the display system, pose estimation of different devices (such as the display apparatus, the given input device and the identified actionable area) and the hand (of an entity: the user), mutual alignment of said poses, and generation of the at least one XR image occur in real time or near-real time. This enables accurate depiction of the given input event in the XR environment with minimal latency, thereby enhancing the user's experience of the XR environment.

Throughout the present disclosure, the term "display apparatus" refers to a specialized equipment that is employed to present an XR environment to the user when the display apparatus in operation is worn by the user on his/her head. The display apparatus acts as a device (for example, such as an XR headset, a pair of XR glasses and the like) that is operable to present a visual scene of an XR environment to the user. It will be appreciated that the display system produces a sequence of XR images for the display apparatus, wherein the sequence of XR images, when rendered via the at least one image renderer of the display apparatus, creates the visual scene of the XR environment. It will be appreciated that the term "extended reality" encompasses virtual reality, augmented reality, mixed reality and the like.

Throughout the present disclosure, the term "image renderer" refers to equipment that, in operation, renders the sequence of XR images produced by the display system. Optionally, a given image renderer is implemented as a display. Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, the given image renderer is implemented as a projector. In this regard, a given XR image is projected onto a projection screen or directly onto a retina of the user's eyes. Examples of the projector include, but are not limited to, an LCD-based projector, an LED-based projector, an OLED-based projector, an LCoS-based projector, a Digital Light Processing (DLP)-based projector, and a laser projector.

It will be appreciated that the term "at least one image renderer" refers to "one image renderer" in some implementations, and "a plurality of image renderers" in other implementations. In some implementations, the at least one image renderer comprises a single image renderer that is used on a shared basis for both eyes of the user. In other implementations, the at least one image renderer comprises at least one first image renderer and at least one second image renderer that are used for a first eye and a second eye of the user, respectively.

Throughout the present disclosure, the term "camera" refers to an equipment that is operable to detect and process light received from the real-world environment, so as to capture a given image of the real-world environment. Optionally, the at least one camera comprises a camera chip, wherein the light received from the real-world environment is directed by at least one optical element onto a photosensitive surface of the camera chip, thereby enabling the at least one camera to capture the given image of the real-world environment. Optionally, the at least one camera is implemented as at least one of: a Red-Green-Blue (RGB) camera, an RGB-Depth (RGB-D) camera, a stereo camera, a plenoptic camera.

Herein, the term "at least one camera" refers to "one camera" in some implementations, and "a plurality of cameras" in other implementations. In some implementations, the at least one camera comprises a stereo camera having at least two lenses with a dedicated camera chip per lens. In such implementations, the stereo camera is employed to capture two offset images (namely, a pair of stereo images) of the real-world environment, which are then processed to generate two offset XR images—one for the first eye of the user and another for the second eye of the user. In other implementations, the at least one camera comprises a plurality of cameras (namely, two or more cameras).

It will be appreciated that the at least one camera comprises at least one visible-light camera. Images captured by the at least one visible-light camera can be understood to be "video see-through images" of the real-world environment. These video see-through images enable tracking of at least input device(s) in the real-world environment. These video see-through images also enable tracking of hand(s) of user(s) in the real-world environment. Additionally, optionally, the at least one camera further comprises at least one depth camera. Images captured by the at least one depth camera can be understood to be "depth images" of the real-world environment. These depth images enable tracking of at least the hand(s) of the user(s) in the real-world environment. These depth images can also be effectively used to supplement the tracking of the input device(s) that is performed using the video see-through images. These depth images are indicative of optical depths of objects present in the real-world environment with respect to the at least one depth camera, and can therefore be beneficially used to determine how sizes of the objects vary according to the optical depths of the objects.

In an example, the at least one camera may comprise two visible-light cameras for capturing video see-through images corresponding to both eyes of the user. In another example, the at least one camera may comprise two visible-light cameras and two depth cameras for capturing video see-through images and depth images, respectively, corresponding to both eyes of the user. It will be appreciated that the at least one camera is arranged to capture a plurality of images of the real-world environment from a perspective of the user's eyes, wherein the plurality of images are utilized to provide a Video See-Through (VST) experience to the user. In this regard, the at least one camera is rigidly arranged on an outer surface of the display apparatus facing the real-world environment. A geometry of the at least one camera with respect to the outer surface of the display apparatus is known to the at least one processor.

Throughout the present disclosure, the term "display-apparatus-tracking means" refers to specialized equipment that is employed to detect and/or follow a pose of the display apparatus within the real-world environment. Throughout the present disclosure, the term "pose" encompasses both position and orientation.

Pursuant to embodiments of the present disclosure, the display-apparatus-tracking means is implemented as a true six Degrees of Freedom (6DoF) tracking system. In other words, the display-apparatus-tracking means tracks both the position and the orientation of the display apparatus within a three-dimensional (3D) space of the real-world environment, which is represented by the aforementioned global coordinate space. In particular, the display-apparatus-tracking means is configured to track translational movements (namely, surge, heave and sway movements) and rotational movements (namely, roll, pitch and yaw movements) of the display apparatus within the 3D space.

The display-apparatus-tracking means could be implemented as an internal component of the display apparatus, as a tracking system external to the display apparatus, or as a combination thereof. As an internal component of the display apparatus, the display-apparatus-tracking means could be implemented as at least one of: an accelerometer, a gyroscope, an Inertial Measurement Unit (IMU), a Timing and Inertial Measurement Unit (TIMU). As an external tracking system, the display-apparatus-tracking means could be implemented as at least one detector that is employed to detect at least one detectable object. When the at least one detectable object is arranged in the real-world environment, the at least one detector is arranged on the display apparatus, and vice versa. Optionally, in this regard, the at least one detectable object is implemented as at least one marker (for example, such as an active infra-red (IR) LED, a visible LED, a laser illuminator, a Quick Response (QR) code, an ArUco marker, a Radio Frequency Identification (RFID) marker and the like), whereas the at least one detector is implemented as at least one of: an IR camera, an IR transceiver, a visible light camera, an RFID reader.

In an example, the display-apparatus-tracking means may be implemented as Valve Corporation's SteamVR® tracking, where active lighthouses (namely, detectable objects) sending infrared signals are installed at fixed locations in the real-world environment in which the display apparatus is being used. In such a case, the display apparatus comprises detectors that detect these infrared signals and determine the pose of the display apparatus relative to the fixed locations of the lighthouses.

In another example, the display-apparatus-tracking means may be implemented as a magnetic tracking system (for example, such as magnetic tracking from Polhemus), where an active magnetic field is generated using a transmitter in the real-world environment, and at least one receiver that is capable of sensing the magnetic field is installed into the display apparatus.

In yet another example, the display-apparatus-tracking means may be implemented as an optical outside-in tracking technique (for example, such as OptiTrack™ and ART tracking), where the display apparatus is fitted with IR retroreflective markers or IR LEDs, and at least one IR camera is installed in the real-world environment to capture IR light reflected from the markers or emitted by the IR LEDs.

Throughout the present disclosure, the term "input device" refers to specialized equipment that is employed by the user to interact with the XR environment. Notably, the user interacts with the XR environment by providing input(s) to the display apparatus, via the at least one input device. The at least one input device is communicably coupled to the display apparatus. Said coupling is wired, wireless, or a combination thereof.

Optionally, a given input device is implemented as at least one of: a keyboard, a mouse, a touchpad, a push button controller, a joystick, a gamepad, an interactive board, a tablet computer, a laptop computer, a trackball.

Throughout the present disclosure, the term "processor" refers to hardware, software, firmware or a combination of these, suitable for controlling the operation of the display system. The at least one processor is communicably coupled with the display apparatus (and specifically, with at least the at least one image renderer and the at least one camera), the display-apparatus-tracking means, and the at least one input device wirelessly and/or in a wired manner. It will be appreciated that the term "at least one processor" refers to "one processor" in some implementations, and "a plurality of processors" in other implementations. In some implementations, the at least one processor is implemented as a processor of the display apparatus. In other implementations, the at least one processor is implemented as the processor of the display apparatus and a processor of an external computing device, wherein the external computing device is communicably coupled with the display apparatus wirelessly or in a wired manner. In such a case, at least a part of all the aforementioned processing tasks of the at least one processor is performed at the processor of the external computing device. This considerably reduces processing burden on the processor of the display apparatus.

Next, there will now be described the aforementioned processing tasks of the at least one processor.

Throughout the present disclosure, the term "input event" refers to an incidence of the user providing an input at a given input device. The at least one processor detects the occurrence of the given input event at the given input device upon receiving, from the given input device, a signal corresponding to the input provided by the user. The signal corresponding to the input is indicative of the actionable area of the given input device.

Throughout the present disclosure, the term "actionable area" refers to a portion of the given input device at which the user provides the input. The actionable area is identified based on the signal corresponding to the input provided by the user. It will be appreciated that the given input device comprises at least one actionable area. The term "at least one actionable area" refers to "one actionable area" in some implementations, and "a plurality of actionable areas" in other implementations. In these other implementations, during the given input event, the user provides the input using one or more actionable areas of the given input device. Furthermore, different signals may optionally be generated corresponding to different actionable areas of the given input device, thereby enabling the at least one processor to accurately ascertain which actionable area(s) was/were used by the user to provide the input pertaining to the given input event.

In an example, the given input device may be implemented as an alphanumeric keyboard. The user may provide the input by pressing at least one key among a plurality of keys of the alphanumeric keyboard. In such an example, each key of the alphanumeric keyboard may correspond to a distinct actionable area within the alphanumeric keyboard, wherein different identification codes would be generated upon pressing different keys. For example, when occurrence of the given input event is detected upon generation of an identification code ID0010, the at least one processor may identify the actionable area as a key 'J' of the alphanumeric keyboard. Alternatively, when an identification code ID002 is generated, the at least one processor may identify the actionable area as a key '2' of the alphanumeric keyboard.

In another example, the given input device may be implemented as an interactive board. The user may provide the input by drawing, using his/her finger or a stylus, on a touch-sensitive surface of the interactive board. In such an example, the actionable area may be identified as that region of the interactive board at which the user draws. Said region may be identified based on coordinates of touch-sensitized elements of the touch-sensitive surface.

In yet another example, the given input device may be implemented as a mouse having three actionable areas—two buttons and one scrolling wheel. The user may provide the input by rotating the scrolling wheel or by pressing a given button.

Throughout the present disclosure, the term "display-apparatus-tracking data" refers to data that is obtained by the at least one processor from the display-apparatus-tracking means, said data being indicative of the pose of the display apparatus during the given input event. It will be appreciated that the display-apparatus-tracking data is obtained continuously whilst the display apparatus is in use. There may be several input events whilst the display apparatus is in use, so the pose of the display apparatus is determined several times during its operation.

The display-apparatus-tracking data is processed to determine the pose of the display apparatus in the global coordinate space. Herein, the term "global coordinate space" refers to the three-dimensional (3D) space of the real-world environment that is represented by a global coordinate system. Optionally, the global coordinate system has a predefined origin and three coordinate axes, for example, such as X, Y and Z axes. Optionally, the 3D position of the display apparatus is expressed as (x, y, z) position coordinates along the X, Y and Z axes, respectively. Optionally, the 3D orientation of the display apparatus is expressed as at least one of: Euler angles, quaternions, rotation matrices, axis angles. It will be appreciated that other conventions for expressing the pose of the display apparatus in the 3D space and representing all 6DoF (namely, three translational degrees of freedom and three rotational degrees of freedom) can be employed alternatively.

Optionally, the display system further comprises a data repository whereat the determined pose of the display apparatus during the given input event is stored, by the at least one processor. The at least one processor is communicably coupled to the data repository. Optionally, the data repository is implemented as at least one of: an external data memory, a data memory of the display apparatus, a data memory of the aforementioned external computing device, a cloud-based memory. It will be appreciated that when the pose of the display apparatus is determined several times during its operation, at least an up-to-date pose of the display apparatus corresponding to a most recent input event is stored at the data repository. Additionally, historical pose(s) of the display apparatus during historical input event(s) may also be stored at the data repository.

Optionally, the at least one processor is configured to:
determine a quality of the display-apparatus-tracking data; and
calibrate the display-apparatus-tracking means based on the determined quality.

Optionally, when determining the quality of the display-apparatus-tracking data, the at least one processor is configured to:
compare a current pose of the display apparatus with a pose predicted from a previous pose of the display apparatus and a velocity and/or acceleration with which the previous pose is changing; and/or
compare display-apparatus-tracking data obtained from the external tracking system with display-apparatus-tracking data obtained from the internal component of the display apparatus, wherein the display-apparatus-tracking means is implemented as a combination of the external tracking system and the internal component. Optionally, in this regard, greater the difference between the compared poses and/or the compared display-apparatus-tracking data, lower is the quality of the display-apparatus-tracking data.

Additionally or alternatively, optionally, the quality of the display-apparatus-tracking data is determined based on at least one of: a sample age of historically stored poses of the display apparatus, a type of the display-apparatus-tracking means, a number of the display-apparatus-tracking means, noise in the display-apparatus-tracking data, a configuration of the display-apparatus-tracking means. In an example, greater the sample age of (namely, older are) the historically stored poses of the display apparatus, lower may be the quality of the display-apparatus-tracking data as old samples are likely to be more unreliable as compared to newer samples. In another example, certain types of display-apparatus-tracking means may be prone to more errors as compared to other types of display-apparatus-tracking means, which may mean that display-apparatus-tracking data obtained from these certain types of display-apparatus-tracking means has lower quality than display-apparatus-tracking data obtained from the other types of display-apparatus-tracking means. In yet another example, lower the number of the display-apparatus-tracking means, lower may be the quality of the display-apparatus-tracking data.

Optionally, the quality of the display-apparatus-tracking data is expressed as one of: a tolerance range about an acceptable level of quality, a probability value for accuracy of a given pose of the display apparatus, a percentage of a maximum possible quality. It will be appreciated that: a greater tolerance range about the acceptable level of quality is indicative of a lower quality, a higher probability value for accuracy of the given pose of the display apparatus is indicative of a higher quality, a higher percentage of the maximum possible quality is indicative of a higher quality. As an example, the quality of the display-apparatus-tracking data may be 90 percent, indicating that the tracked pose of the display apparatus is 90 percent accurate.

It will be appreciated that when optionally calibrating the display-apparatus-tracking means based on the determined quality of the display-apparatus-tracking data, an extent of calibration required varies inversely with a measure of the quality. Greater the quality of the display-apparatus-tracking data, lesser is the required calibration, and vice versa.

Throughout the present disclosure, the term "first image" refers to a visible-light image (namely, a video see-through image). The at least one first image is representative of visible features (for example, such as colour, shape, size, geometry, texture, material, and the like) of the objects present in the real-world environment.

It will be appreciated that the at least one first image enables pose tracking of the given input device and the actionable area. Therefore, the at least one camera used to capture the at least one first image can be understood to be a tracking system for the given input device and the actionable area.

Optionally, when processing the at least one first image, the at least one processor is configured to:
extract a plurality of features from the at least one first image; identify a set of features in the plurality of features that are representative of the given input device; and
determine a relative pose of a given feature of the set with respect to the display apparatus.

It will be appreciated that the at least one first image represents how the objects present in the real-world environment appear from a perspective of the at least one camera. The identified set of features are optionally used to identify the given input device, while the relative poses of the features of the set with respect to the display apparatus are optionally used to determine the relative pose of the given input device and the identified actionable area with respect to the display apparatus. Notably, the relative pose of the given input device and the identified actionable area with respect to the display apparatus is determined in a first coordinate space associated with the at least one camera used to capture the at least one first image, wherein the at least one camera lies at an origin of the first coordinate space. The first coordinate space can simply be understood to be a "video see-through coordinate space".

Optionally, the at least one processor is configured to employ at least one image-processing algorithm to extract and analyse features from a given image. Examples of the features include, but are not limited to, points, edges, corners, blobs and ridges.

It will be appreciated that feature extraction and analysis is well-known in the art. Examples of the at least one image-processing algorithm include, but are not limited to:
an edge-detection algorithm (for example, such as Canny edge detector, Deriche edge detector and the like),
a corner-detection algorithm (for example, such as Harris & Stephens corner detector, Shi-Tomasi corner detector, Features from Accelerated Segment Test (FAST) corner detector and the like),
a blob-detection algorithm (for example, such as Laplacian of Gaussian (LoG)-based blob detector, Difference of Gaussians (DoG)-based blob detector, Maximally Stable Extremal Regions (MSER) blob detector and the like),
a feature descriptor algorithm (for example, such as Binary Robust Independent Elementary Features (BRIEF), Gradient Location and Orientation Histogram (GLOH), Histogram of Oriented Gradients (HOG) and the like), and
a feature detector algorithm (for example, such as Scale-Invariant Feature Transform (SIFT), Oriented FAST and rotated BRIEF (ORB), Speeded Up Robust Features (SURF) and the like).

Optionally, the at least one processor is configured to store, at the data repository, information pertaining to the features extracted from the at least one first image, at least temporarily.

It will be appreciated that the pose of the display apparatus during the given input event is determined in the global coordinate space based on the display-apparatus-tracking data obtained from the display-apparatus-tracking means. Therefore, once the relative pose of the given input device and the identified actionable area with respect to the display apparatus is determined, the pose of the given input device and the identified actionable area in the global coordinate space can be determined. Pursuant to embodiments of the present disclosure, the pose of the given input device and the identified actionable area in the global coordinate space is determined based on the relative pose of the given input device and the identified actionable area with respect to the display apparatus (at which the at least one camera that captured the at least one first image is arranged) and the pose of the display apparatus during the given input event in the global coordinate space.

Optionally, the at least one processor is configured to store, at the data repository, the pose of the given input device and the identified actionable area during the given input event in the global coordinate space.

Optionally, the at least one processor is configured to:
process the at least one first image to identify features in the plurality of features that are representative of at least one other object in the real-world environment;
determine relative poses of the identified features with respect to the display apparatus;
determine a relative pose of the at least one other object with respect to the display apparatus during the given input event, based on the relative poses of the identified features with respect to the display apparatus;
determine a pose of the at least one other object during the given input event in the global coordinate space, based on the relative pose of the at least one other object with respect to the display apparatus and the pose of the display apparatus during the given input event in the global coordinate space; and
store, at the data repository, the pose of the at least one other object during the given input event in the global coordinate space.

In this regard, the term "other object" has been used to refer to objects other than (namely, except) the given input device, the identified actionable area, and the user's hand.

Optionally, the at least one second image comprises at least one visible-light image. In such a case, the at least one second image is similar to the at least one first image. Alternatively, optionally, the at least one second image comprises a depth image.

It will be appreciated that the at least one second image enables pose tracking of the hand. Therefore, the at least one camera used to capture the at least one first image can be understood to be a tracking system for the hand.

Optionally, when processing the at least one second image, the at least one processor is configured to:
extract a plurality of features from the at least one second image;
identify a set of features in the plurality of features that are representative of the hand of the user; and
determine a relative pose of a given feature of the set with respect to the display apparatus.

It will be appreciated that the identified set of features that are representative of the hand of the user are optionally used to identify the hand of the user, while the relative pose of the given feature of the set with respect to the display apparatus is optionally used to determine the relative pose of the hand of the user with respect to the display apparatus. Notably, the relative pose of the hand of the user with respect to the display apparatus is determined in a second coordinate space associated with the at least one camera used to capture the at least one second image, wherein the at least one camera lies at an origin of the second coordinate space. The second coordinate space can simply be understood to be a "video see-through coordinate space" when the at least one camera used to capture the at least one second image is implemented as at least one visible-light camera, or be understood to be a "depth coordinate space" when the at least one camera used to capture the at least one second image is implemented as at least one depth camera.

Optionally, the at least one processor is configured to store, at the data repository, information pertaining to the features extracted from the at least one second image, at least temporarily.

It will be appreciated that the pose of the display apparatus during the given input event is determined in the global coordinate space based on the display-apparatus-tracking data obtained from the display-apparatus-tracking means. Therefore, once the relative pose of the hand with respect to the display apparatus during the given input event is determined, the pose of the hand in the global coordinate space can be determined. Pursuant to embodiments of the present disclosure, the pose of the hand during the given input event in the global coordinate space is determined based on the relative pose of the hand with respect to the display apparatus (at which the at least one camera that captured the at least one second image is arranged) and the pose of the display apparatus during the given input event in the global coordinate space.

Optionally, the at least one processor is configured to store, at the data repository, the pose of the hand during the given input event in the global coordinate space.

It will be appreciated that at least one of: the pose of the given input device and the identified actionable area, the pose of the at least one other object, and the pose of the hand in the global coordinate space may change at any time whilst the display apparatus is in operation. Therefore, optionally, the at least one processor is configured to determine at least one of: a current pose of the given input device and the identified actionable area, a current pose of the at least one other object, a current pose of the hand in the global coordinate space, at several times during the operation of the display apparatus and store the determined pose(s) at the data repository. In this way, the data repository stays updated with latest pose information.

It will be appreciated that even though the pose of the given input device and the identified actionable area and the pose of the hand are determined in the same coordinate space (which is the global coordinate space), these poses typically do not align. This may be attributed to errors and limitations of image processing operation(s) that are performed for processing the at least one first image and/or the at least one second image. However, the pose of the given input device and the identified actionable area and the pose of the hand are required to be aligned in the same coordinate space for generating realistic and pose-consistent XR images. Therefore, said poses are adjusted in a manner that the adjusted pose of the hand aligns with the adjusted pose of the identified actionable area.

Optionally, the pose of the given input device and the identified actionable area and the pose of the hand are adjusted based on at least one matching point at which the pose of the hand aligns with the pose of the actionable area of the given input device. During the given input event, a plurality of points in the real-world environment are likely to be common to the given input device and the identified actionable area and the hand, as the user touches the actionable area with his/her hand to provide the input. These matching point(s) can therefore serve as an accurate reference for adjusting the pose of the given input device and the identified actionable area and the pose of the hand for their required alignment. The at least one matching point is used to extrapolate or interpolate poses of other points in the real-world environment, thereby causing the pose of the (entire) given input device and the pose of the (entire) hand to be adjusted in a manner that the adjusted pose of the hand aligns with the adjusted pose of the identified actionable area. Optionally, said extrapolation or interpolation of the poses of other points in the real-world environment requires a minimum of three matching points as reference.

Optionally, the at least one processor is configured to store, at the data repository, a pose of the at least one matching point in the global coordinate space. It will be appreciated that the global coordinate space can be understood to be a joint coordinate space, the joint coordinate space comprising the pose of the at least one matching point between the given input device and the identified actionable area and the hand. Optionally, whenever there occurs an event in which a given matching point between different tracking systems is detected, a pose of the given matching point in the joint coordinate space is stored at the data repository. Examples of such events include, but are not limited to, input events (wherein the user provides his/her input via input device(s)) and calibration events (wherein the display system prompts the user to touch a fiducial marker in the real-world environment for enabling automatic joint calibration the different tracking systems). It will be appreciated that in the joint tracking space, different matching points may have different weightages. For example, a matching point corresponding to a movable object may have a lesser weight as compared to a matching point corresponding to a stationary object, as poses of stationary objects are more reliable than poses of movable objects.

It will be appreciated that the aforesaid adjustment enables different tracking systems to be calibrated in a manner that they align well with each other. When the at least one camera used to capture the at least one first image and the at least one second image is the same, the at least one camera and the display-apparatus-tracking means are auto-calibrated with respect to each other at the given input event. When different cameras are used to capture the at least one first image and the at least one second image, these different cameras are auto-calibrated with respect to each other and to the display-apparatus-tracking means at the given input event. When the different tracking systems are well-calibrated to align with each other, the adjusted pose of the hand would always be accurately-aligned with the adjusted pose of the identified actionable area, despite changes that may occur in the pose of the given input device and the identified actionable area and the pose of the hand during operation of the display apparatus. Beneficially, such auto-calibration of different pose tracking means is much more efficient, accurate and relevant in real-time during operation of the display apparatus as compared to conventional manual calibration techniques.

Optionally, the at least one processor is configured to store, at the data repository, the adjusted pose of the given input device and the identified actionable area and/or the adjusted pose of the hand along with a timestamp indicative of a time of the given input event. Furthermore, optionally, the at least one processor is configured to determine a sample age of historically stored poses of the given input device and the identified actionable area at the data repository, using timestamps associated with said historically stored poses. Similarly, optionally, the at least one processor is configured to determine a sample age of historically stored poses of the hand at the data repository, using timestamps associated with said historically stored poses.

Optionally, the at least one processor is configured to:
determine an input-device-tracking quality with which the relative pose of the given input device with respect to the display apparatus is determined from the at least one first image; and
determine a hand-tracking quality with which the relative pose of the hand with respect to the display apparatus is determined from the at least one second image,
wherein the at least one processor is configured to adjust the pose of the given input device and the identified actionable area and the pose of the hand, based on the input-device-tracking quality and the hand-tracking quality.

Optionally, the input-device-tracking quality is determined based on at least one of: the sample age of historically stored poses of the given input device and the identified actionable area, occlusion of the given input device by another object, movement of the given input device, noise associated with the at least one first image, number and/or type of features that are representative of the given input device. In an example, greater the sample age of the historically stored poses of the given input device and the identified actionable area, lower may be the input-device-tracking quality. In another example, greater an extent of occlusion of the given input device by another object (for example, such as the user's hand), lower may be the input-device-tracking quality. In yet another example, greater the movement of the given input device, lower may be the input-device-tracking quality. In still another example, greater the noise associated with the at least one first image, lower may be the input-device-tracking quality. In yet another example, greater the number of features that are representative of the given input device, greater may be the input-device-tracking quality. In still another example, certain types of features (for example, such as edges) that are representative of the given input device may be prone to more errors as compared to other types of features (for example, such as corners) that are representative of the given input device, meaning that input-device-tracking quality obtained from these certain types of features has lower quality than input-device-tracking quality obtained from the other types of features.

Optionally, the hand-tracking quality is determined based on at least one of: the sample age of historically stored poses of the hand, occlusion of the hand by another object, movement of the hand, noise associated with the at least one second image, number and/or type of features that are representative of the hand. In an example, greater the sample age of the historically stored poses of the hand, lower may be the hand-tracking quality. In another example, greater an extent of occlusion of the hand by another object, lower may be the hand-tracking quality. In yet another example, greater the movement of the hand, lower may be the hand-tracking quality. In still another example, greater the noise associated with the at least one second image, lower may be the hand-tracking quality. In yet another example, greater the number of features that are representative of the hand, greater may be the hand-tracking quality. In still another example, certain types of features (for example, such as points) that are representative of the hand may be prone to more errors as compared to other types of features (for example, such as edges) that are representative of the hand, meaning that hand-tracking quality obtained from these certain types of features has lower quality than hand-tracking quality obtained from the other types of features.

Optionally, the input-device-tracking quality and/or the hand-tracking quality is expressed as one of: a tolerance range about an acceptable level of quality, a probability value for accuracy of a given pose, a percentage of a maximum possible quality. It will be appreciated that: a greater tolerance range about the acceptable level of quality is indicative of a lesser measure of tracking quality, a higher probability value for accuracy is indicative of a higher measure of tracking quality, a higher percentage of the maximum possible quality is indicative of a higher measure of tracking quality. As an example, the input-device-tracking quality and the hand-tracking quality may be 90 percent and 80 percent, respectively. This indicates that the tracked relative poses of the given input device and the hand with respect to the display apparatus are 90 percent and 80 percent accurate, respectively.

Optionally, when the input-device-tracking quality is higher than the hand-tracking quality, the pose of the hand is adjusted to a greater extent as compared to the pose of the given input device and the identified actionable area. Alternatively, optionally, when the hand-tracking quality is higher than the input-device-tracking quality, the pose of the given input device and the identified actionable area is adjusted to a greater extent as compared to the pose of the hand. Yet alternatively, optionally, when the input-device-tracking quality and the hand-tracking quality are equal or nearly-equal, the pose of the given input device and the identified actionable area and the pose of the hand are adjusted to an equal or nearly-equal extent.

It will be appreciated that optionally making pose adjustment based on the input-device-tracking quality and the hand-tracking quality ensures that said pose adjustment is made extremely efficiently to improve accuracy of the poses upon adjustment. Selecting a given pose corresponding to a better tracking quality as a frame of reference for adjusting another pose corresponding to a lower tracking quality ensures improvement in accuracy of the another pose upon adjustment, whilst also ensuring that accuracy of the given pose is not compromised in making said adjustment.

Pursuant to embodiments of the present disclosure, the at least one XR image is generated by processing the at least one first image, based on the adjusted pose of the given input device and the identified actionable area and the adjusted pose of the hand. In the at least one XR image, the virtual representation of the hand (which emulates the adjusted pose of the hand) is accurately superimposed over the virtual representation of the identified actionable area of the given input device (which emulates the adjusted pose of the given input device and the identified actionable area). In particular, the virtual representation of the hand aligns with the virtual representation of the identified actionable area in a manner similar to how the adjusted pose of the hand aligns with the adjusted pose of the identified actionable area. Therefore, the virtual representation of the hand is accurately and realistically superimposed over the virtual representation of the identified actionable area. This enables the at least one XR image to present, during the given input event (namely, in real time or near real time), the user with a correct and immersive depiction of the occurrence of the given input event.

Optionally, when generating a given XR image, at least one virtual object is embedded in the real-world environment to produce the XR environment. In such a case, the given XR image could be an Augmented-Reality (AR) image, a Mixed-Reality (MR) image or similar. As an example, the given XR image may be representative of a real-world object (for example, such as a table) and a virtual object (for example, such as a flower vase placed on top of the table). Alternatively, optionally, when generating a given XR image, at least one virtual object is embedded in a virtual environment to produce the XR environment. In such a case, the given XR image is a Virtual-Reality (VR) image.

It will be appreciated that pose determination of different elements (such as the display apparatus, the given input device and the identified actionable area, and the hand), mutual alignment of said poses, and generation of the at least one XR image occurs in real time or near-real time. Notably, all these processing steps are implemented, upon the occurrence of the given input event, in real time or near-real time. The at least one XR image so generated accurately depicts the given input event in the XR environment.

Optionally, when generating the at least one extended-reality image, the at least one processor is configured to virtually superimpose a functional element over the virtual representation of the identified actionable area of the given input device. Optionally, the functional element comprises one of: a symbol, a coloured indicator, a flashing indicator, a textual instruction, a graphical instruction. Herein, the term "functional element" refers to a visual indication (namely, a visual cue) of the occurrence of the given input event.

Optionally, the at least one processor is configured to:
identify a first image segment of the at least one first image that represents the given input device; and
determine a location of the actionable area of the given input device in the first image segment,
wherein, when generating the at least one extended-reality image, the at least one processor is configured to replace the first image segment with a virtual representation of the given input device, wherein the identified actionable area of the given input device is represented virtually in the virtual representation of the given input device based on the location of the actionable area in the first image segment.

Throughout the present disclosure, the term "image segment" refers to a set of pixels that represents at least one object.

Optionally, the at least one processor is configured to employ at least one image segmentation algorithm to divide the at least one first image into a plurality of image segments. Examples of the at least one image segmentation algorithm include, but are not limited to, a threshold segmentation algorithm, a regional-growth-based segmentation algorithm, an edge detection-based segmentation algorithm, a clustering-based segmentation algorithm, a neural-network-based segmentation algorithm. Image segmentation algorithms are well-known in the art.

Furthermore, optionally, the at least one processor is configured to employ at least one object recognition algorithm to recognize objects represented in the plurality of image segments for identifying the first image segment that represents the given input device. Examples of the at least one object recognition algorithm include, but are not limited to, a feature recognition algorithm, a pattern recognition algorithm, and a genetic object recognition algorithm. Object recognition algorithms are well-known in the art.

Optionally, when determining the location of the actionable area of the given input device in the first image segment, the at least one processor is configured to:

access a database having stored therein reference images of different types of input devices and different variations of a given type of input device;

compare the at least one first image with the reference images to identify a type and variation of the given input device;

access, from the database, information about the type and variation of the given input device; and determine the location of the actionable area of the given input device based on the information about the type and variation of the given input device.

Additionally or alternatively, optionally, when determining the location of the actionable area of the given input device in the first image segment, the at least one processor is configured to:

obtain, from a computing device associated with the given input device, information identifying a type and variation of the given input device;

access, from a database, information about the type and variation of the given input device; and determine the location of the actionable area in the given input device based on the information about the type and variation of the given input device.

It will be appreciated that the database could be implemented as the data repository of the display system, or any other external data repository. Furthermore, optionally, the computing device associated with the given input device is the external computing device that is communicably coupled with the display apparatus.

The at least one XR image is optionally generated by replacing the first image segment with the virtual representation of the given input device in a manner that a location of the virtual representation of the actionable area within the virtual representation of the given input device corresponds to the location of the actionable area in the first image segment.

Optionally, the at least one processor is configured to:
identify a second image segment of the at least one first image that represents the user's hand; and
process the second image segment and/or the at least one second image to identify a hand gesture of the user's hand,
wherein, when generating the at least one extended-reality image, the at least one processor is configured to replace the second image segment with a virtual representation of the user's hand performing the identified hand gesture.

Optionally, the at least one processor is configured to employ least one object recognition algorithm to identify the second image segment of the at least one first image that represents the user's hand.

Optionally, when identifying the hand gesture of the user's hand, the at least one processor is configured to:
access a database having stored therein reference images of different types of hand gestures of users' hands; and
compare the second image segment and/or the at least one second image with the reference images to identify the hand gesture of the user's hand.

The term "hand gesture" refers to an interaction indication made by the hand of the user to provide the input pertaining to the given input event. Examples of the hand gesture include, but are not limited to, a pointing gesture, a pressing gesture, a holding gesture, a pushing gesture, a pulling gesture, and a grabbing gesture. It will be appreciated that the at least one second image can optionally be employed to identify the hand gesture of the user's hand when the at least one second image comprises a depth image. Depth images enable highly accurate identification of hand gestures.

The at least one XR image is optionally generated by replacing the second image segment with the virtual representation of the user's hand performing the identified hand gesture in a manner that said virtual representation is aligned with the virtual representation of the identified actionable area of the given input device. In this way, the at least one XR image realistically represents provision of the input (by the user) at the actionable area during the given input event.

The at least one processor renders the at least one XR image via the at least one image renderer of the display apparatus, to present the user with a truly immersive experience of the XR environment. The at least one XR image, when rendered, provides the user with a realistic visualization of the occurrence of the given input event. Notably, the rendered XR image(s) depict a realistic view of the XR environment that is generated upon combining visual information as well as pose tracking information from different tracking systems.

Optionally, the at least one processor is configured to:
generate a depth map indicative of an optical depth of objects present in the real-world environment with respect to the display apparatus during the given input event, the objects comprising the given input device, the identified actionable area and the user's hand; and
utilize the depth map when determining the relative pose of the given input device and the identified actionable area and the relative pose of the user's hand with respect to the display apparatus during the given input event.

In this regard, the at least one processor optionally utilizes the depth map to extract therefrom optical depths of the given input device, the identified actionable area, and the user's hand with respect to the display apparatus, wherein said optical depths are indicative of the relative poses of the given input device, the identified actionable area, and the user's hand with respect to the display apparatus, respectively, during the given input event.

Optionally, the at least one first image comprises a pair of stereo images, and wherein, when generating the depth map, the at least one processor is configured to match pixels of the pair of stereo images that represent a given three-dimensional point in the real-world environment and determine binocular disparities between matching pixels of the pair of stereo images. In this regard, the determined binocular disparities are indicative of optical depths of objects present in the real-world environment with respect to the at least one camera used to capture the pair of stereo images, and additionally, with respect to the display apparatus (as the arrangement of the at least one camera on the display apparatus is known).

Additionally or alternatively, optionally, the at least one camera comprises a depth camera, the at least one second image comprising a depth image of the real-world environment, wherein the at least one processor is configured to utilize the depth image when generating the depth map.

In this regard, the depth image of the real-world environment is indicative of optical depths of objects present in the real-world environment with respect to the depth camera. Said optical depths are determined in the depth coordinate space associated with the depth camera used to capture the depth image, wherein the depth camera lies at an origin of the depth coordinate space. The depth image can be effectively utilized for generating the depth map since the known arrangement of the depth camera on the display apparatus allows the depth image to be indicative of the optical depths of the objects present in the real-world environment with respect to the display apparatus. Examples of the depth camera include, but are not limited to, an RGB-D camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment.

Throughout the present disclosure, the term "depth map" refers to a data structure comprising depth information pertaining to optical depths (namely, optical distances) of the objects present in the real-world environment with respect to the display apparatus during the given input event. Throughout the present disclosure, the term "object" encompasses both living objects and non-living objects present in the real-world environment. Moreover, the term "object" could be used to refer to an entirety of a given object, as well as to a portion of the given object. As an example, objects present in the real-world environment may comprise a keyboard (which is an input device), keys of the keyboard (which is a portion of said input device), both hands of a user, a workstation on which the keyboard is placed, a pen stand on the workstation, a couch, and a cat lying on the couch.

It will be appreciated that the depth map is also indicative of optical depths of other objects present in the real-world environment with respect to the display apparatus during the given input event, and not just of the optical depths of the given input device, the identified actionable area, and the user's hand. Optionally, the at least one processor is configured to update the depth map as and when input events occur during the operation of the display apparatus.

In an embodiment, the depth map is an array of optical depth values associated with the real-world environment, wherein a given element of the array describes an optical depth value of its corresponding region within the real-world environment with respect to the display apparatus during the given input event. In another embodiment, the depth map is a depth image comprising a plurality of pixels, wherein a colour of each pixel indicates optical depth of its corresponding region within the real-world environment with respect to the display apparatus during the given input event. In yet another embodiment, the depth map is a voxel map of the real-world environment. The voxel map comprises a plurality of three-dimensional volume elements that collectively constitute the real-world environment, wherein each three-dimensional volume element represents a three-dimensional region within the real-world environment. A given three-dimensional volume element is indicative of the optical depth of its corresponding region within the real-world environment.

Optionally, the display system further comprises input-device-tracking means, wherein the at least one processor is configured to:
process input-device-tracking data, obtained from the input-device-tracking means, to determine an additional pose of the given input device during the given input event, wherein the additional pose of the given input device is determined in an additional coordinate space;
convert the additional pose of the given input device from the additional coordinate space to the global coordinate space; and
adjust the pose of the given input device and the identified actionable area based on a difference between the converted additional pose of the given input device and the pose of the given input device.

Throughout the present disclosure, the term "input-device-tracking means" refers to specialized equipment that is employed to detect and/or follow the pose of the given input device within the real-world environment. Pursuant to embodiments of the present disclosure, the input-device-tracking means is implemented as a true six Degrees of Freedom (6DoF) tracking system. In other words, the input-device-tracking means tracks both the position and the orientation of the given input device within the additional coordinate space. The term "additional coordinate space" refers to a local coordinate space of the input-device-tracking means, whereas the term "additional pose" refers to a local pose of the given input device within the additional coordinate space. Using the additional pose of the given input device in the aforesaid manner enables the at least one processor to adjust the pose of the given input device and the identified actionable area to further improve accuracy of said pose in the global coordinate space.

It will be appreciated that input-device-tracking means could optionally be implemented as an internal component of the given input device, as a tracking system external to the given input device, or as a combination thereof. As an example, the input-device-tracking means may be implemented as at least one of: an accelerometer, a gyroscope, an Inertial Measurement Unit (IMU), a Timing and Inertial Measurement Unit (TIMU). As another example, the input-device-tracking means may be implemented as a receiver that is employed to sense signals emitted from an emitter. When the emitter is arranged in the real-world environment, the receiver is arranged on the given input device, and vice-versa. Optionally, in this regard, the receiver is implemented as a sensor that, in operation, senses the emitted signals, the emitted signals being at least one of: magnetic signals, electromagnetic signals (for example, such as radio signals, visible signals (light), infrared signals, and the like), acoustic signals. Likewise, optionally, the emitter is implemented as at least one of: a magnetic signal emitter, an electromagnetic signal emitter, an acoustic signal emitter. It will be appreciated that the receiver is compatible with the emitter.

Optionally, the pose of the given input device and the identified actionable area is adjusted based on a quality of the input-device-tracking data, the quality of the input-device-tracking data being based on at least one of: a sample age of historical additional poses of the given input device, movement of the given input device, noise associated with the input-device-tracking data.

Furthermore, the present disclosure also relates to the method as described above. Various embodiments and variants disclosed above apply mutatis mutandis to the method.

Optionally, the method further comprises:
determining an input-device-tracking quality with which the relative pose of the given input device with respect to the display apparatus is determined from the at least one first image; and
determining a hand-tracking quality with which the relative pose of the hand with respect to the display apparatus is determined from the at least one second image,
wherein the step of adjusting the pose of the given input device and the identified actionable area and the pose of the hand is performed based on the input-device-tracking quality and the hand-tracking quality.

Optionally, the method further comprises:
determining a quality of the display-apparatus-tracking data; and calibrating, based on the determined quality, display-apparatus-tracking means from which the display-apparatus-tracking data is obtained.

Optionally, the method of claim further comprises:

identifying a first image segment of the at least one first image that represents the given input device; and determining a location of the actionable area of the given input device in the first image segment, wherein the step of processing the at least one first image to generate the at least one extended-reality image comprises replacing the first image segment with a virtual representation of the given input device, wherein the identified actionable area of the given input device is represented virtually in the virtual representation of the given input device based on the location of the actionable area in the first image segment.

Optionally, the method further comprises:

identifying a second image segment of the at least one first image that represents the user's hand; and processing the second image segment and/or the at least one second image to identify a hand gesture of the user's hand, wherein the step of processing the at least one first image to generate the at least one extended-reality image comprises replacing the second image segment with a virtual representation of the user's hand performing the identified hand gesture.

Optionally, the method further comprises:

generating a depth map indicative of an optical depth of objects present in the real-world environment with respect to the display apparatus during the given input event, the objects comprising the given input device, the identified actionable area and the user's hand; and utilizing the depth map when determining the relative pose of the given input device and the identified actionable area and the relative pose of the user's hand with respect to the display apparatus during the given input event.

Optionally, in the method, the at least one first image comprises a pair of stereo images, and wherein the step of generating the depth map comprises matching pixels of the pair of stereo images that represent a given three-dimensional point in the real-world environment and determining binocular disparities between matching pixels of the pair of stereo images.

Optionally, in the method, the at least one second image comprises a depth image of the real-world environment, the method further comprising utilizing the depth image when generating the depth map.

Optionally, the method further comprises:

processing input-device-tracking data to determine an additional pose of the given input device during the given input event, wherein the additional pose of the given input device is determined in an additional coordinate space;

converting the additional pose of the given input device from the additional coordinate space to the global coordinate space; and adjusting the pose of the given input device and the identified actionable area based on a difference between the converted additional pose of the given input device and the pose of the given input device.

DETAILED DESCRIPTION OF THE DRAWINGS

Referring to FIG. 1, illustrated is a block diagram of architecture of a display system 100, in accordance with an embodiment of the present disclosure. The display system 100 comprises:

a display apparatus 102 comprising at least one image renderer (depicted as an image renderer 104) and at least one camera (depicted as a camera 106);

display-apparatus-tracking means 108;

at least one input device (depicted as an input device 110) associated with the display apparatus 102; and at least one processor (depicted as a processor 112).

The processor 112 is configured to:

detect an occurrence of a given input event at the input device 110 and identify an actionable area of the input device 110 using which a user provided an input pertaining to the given input event;

process display-apparatus-tracking data, obtained from the display-apparatus-tracking means 108, to determine a pose of the display apparatus 102 during the given input event, wherein the pose of the display apparatus 102 is determined in a global coordinate space;

process at least one first image of a real-world environment, captured by the camera 106, to identify the input device 110 in the real-world environment and to determine a relative pose of the input device 110 and the identified actionable area with respect to the display apparatus 102 during the given input event;

determine a pose of the input device 110 and the identified actionable area during the given input event in the global coordinate space, based on the relative pose of the input device 110 and the identified actionable area with respect to the display apparatus 102 and the pose of the display apparatus 102 during the given input event;

process at least one second image of the real-world environment, captured by the camera 106, to identify a hand of the user and to determine a relative pose of the hand with respect to the display apparatus 102 during the given input event;

determine a pose of the hand during the given input event in the global coordinate space, based on the relative pose of the hand with respect to the display apparatus 102 and the pose of the display apparatus 102 during the given input event;

adjust the pose of the input device 110 and the identified actionable area and the pose of the hand in a manner that the adjusted pose of the hand aligns with the adjusted pose of the identified actionable area;

process the at least one first image, based on the adjusted pose of the input device 110 and the identified actionable area and the adjusted pose of the hand, to generate at least one extended-reality image in which a virtual representation of the hand is superimposed over a virtual representation of the identified actionable area of the input device 110; and render the at least one extended-reality image via the image renderer 104 of the display apparatus 102.

Figure 2:
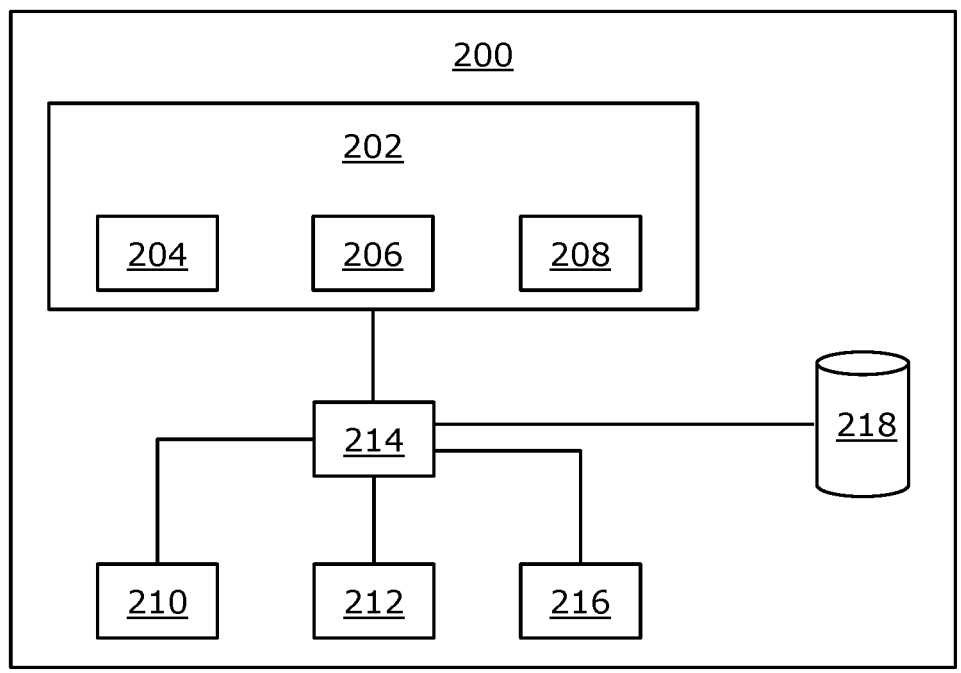

Referring to FIG. 2, illustrated is a block diagram of architecture of a display system 200, in accordance with another embodiment of the present disclosure. The display system 200 comprises: a display apparatus 202 comprising at least one image renderer (depicted as an image renderer 204) and at least one camera (depicted as a visible-light camera 206 and a depth camera 208); display-apparatus-tracking means 210; at least one input device (depicted as an input device 212) associated with the display apparatus 202; and at least one processor (depicted as a processor 214). The processor 214 is coupled to the display apparatus 202, the display-apparatus-tracking means 210, and the input device 212.

The display system 200 further comprises input-device-tracking means 216 and a data repository 218. As shown, the processor 214 is also coupled to the input-device-tracking means 216 and the data repository 218.

It may be understood by a person skilled in the art that the FIGS. 1 and 2 include simplified architectures of different display systems 100 and 200 for sake of clarity, which should not unduly limit the scope of the claims herein. The person skilled in the art will recognize many variations, alternatives, and modifications of embodiments of the present disclosure.

Figure 3A:
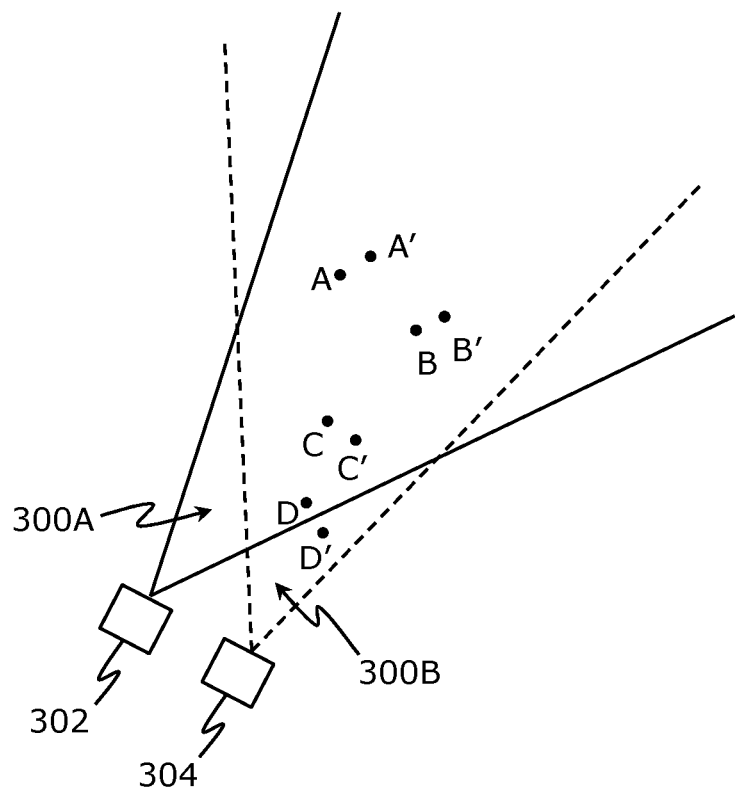
Figure 3B:
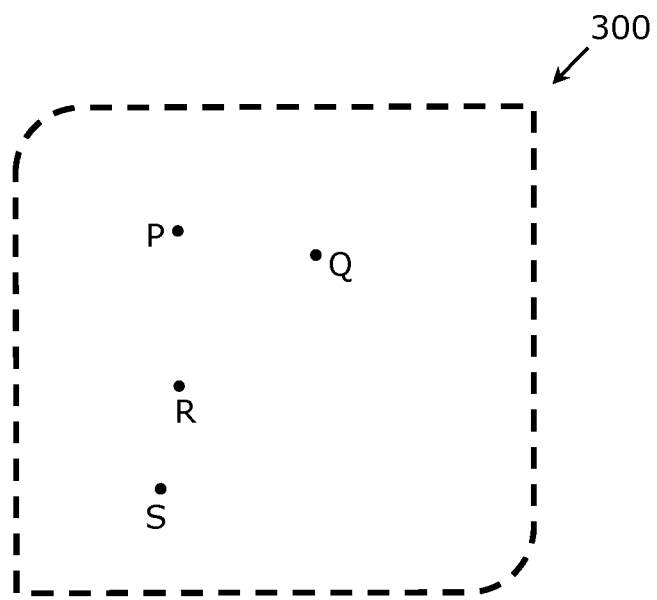
FIG. 3B illustrates a top view of a global coordinate space comprising the two coordinate spaces of FIG. 3A, in accordance with an embodiment of the present disclosure.

Referring to FIG. 3A and FIG. 3B, FIG. 3A illustrates a top view of two coordinate spaces 300A and 300B of two cameras in a real-world environment, the two cameras comprising a first camera 302 for capturing a first image and a second camera 304 for capturing a second image, while FIG. 3B illustrates a top view of a global coordinate space 300 comprising the two coordinate spaces 300A and 300B of FIG. 3A, in accordance with an embodiment of the present disclosure.

In FIG. 3A, there are shown four points A, B, C, and D within the coordinate space 300A. Notably, poses of the four points A, B, C, and D are determined with respect to the first camera 302, wherein the first camera 302 serves as an origin of the coordinate space 300A. Moreover, in FIG. 3A, there are also shown four points A', B', C', and D' within the coordinate space 300B. Notably, poses of the four points A', B', C', and D' are determined with respect to the second camera 304, wherein the second camera 304 serves as an origin of the coordinate space 300B.

The points A and A' correspond to a first point within the real-world environment, the first point appearing to have different relative poses within the coordinate spaces 300A and 300B due to different origins of the coordinate spaces 300A and 300B. Likewise, the points B and B' correspond to a second point, the points C and C' correspond to a third point, and the points D and D' correspond to a fourth point within the real-world environment.

In FIG. 3B, the global coordinate space 300 depicts the first point P, the second point Q, the third point R, and the fourth point S within the real-world environment. The global coordinate space 300 can be understood to be a joint coordinate space comprising the coordinate spaces 300A and 300B. The pose of first point P corresponds to the pose of point A, in a case where it is determined that the pose of point A is more accurate than the pose of point A'. The pose of second point Q is determined by extrapolating the poses of points B and B', in a case where it is determined that neither of the poses of point B or point B' are accurate. The pose of third point R is determined by interpolating the poses of points C and C', in a case where it is determined that both the poses of point C or point C' are nearly-equally accurate. The pose of fourth point S corresponds to the pose of point D', in a case where it is determined that the pose of point D' is more accurate than the pose of point D.

It may be understood by a person skilled in the art that the FIGS. 3A and 3B are merely examples for sake of clarity, which should not unduly limit the scope of the claims herein. The person skilled in the art will recognize many variations, alternatives, and modifications of embodiments of the present disclosure.

Figure 4:
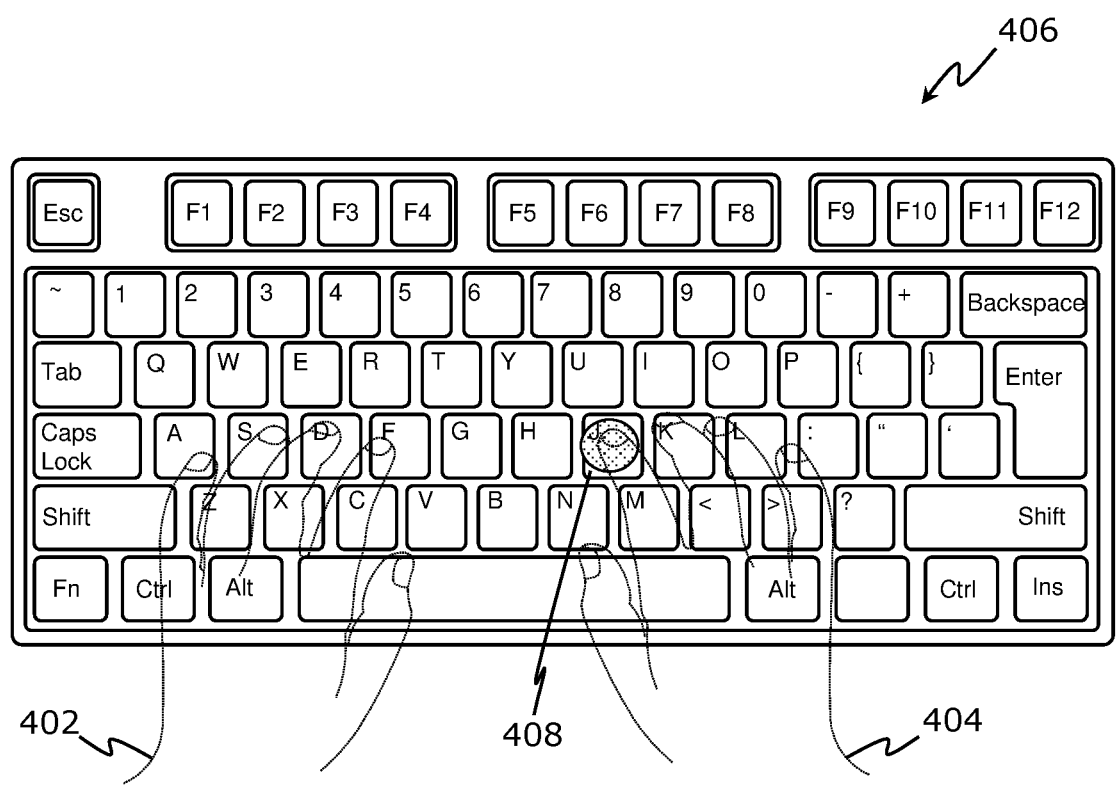
FIG. 4 illustrates a portion of an extended-reality image, in accordance with an embodiment of the present disclosure.

Referring to FIG. 4, illustrated is a portion of an extended-reality image, in accordance with an embodiment of the present disclosure. In said portion, virtual representations 402 and 404 of a left hand and a right hand, respectively, of a user are shown to be superimposed over a virtual representation 406 of a given input device. The virtual representation 404 of the user's right hand is well-aligned with a virtual representation 408 of an actionable area (depicted as a keyboard button 'J') of the given input device. This indicates occurrence of an input event of the user pressing the keyboard button 'J' using an index finger of his/her right hand. Additionally, a functional element (for example, such as a colored indicator that is depicted as a hatched circle) is also shown to be virtually superimposed over the virtual representation 408. This functional element acts as an additional visual indication of the occurrence of the given input event.

It may be understood by a person skilled in the art that the FIG. 4 is merely an example for sake of clarity, which should not unduly limit the scope of the claims herein. The person skilled in the art will recognize many variations, alternatives, and modifications of embodiments of the present disclosure.

Figure 5A:
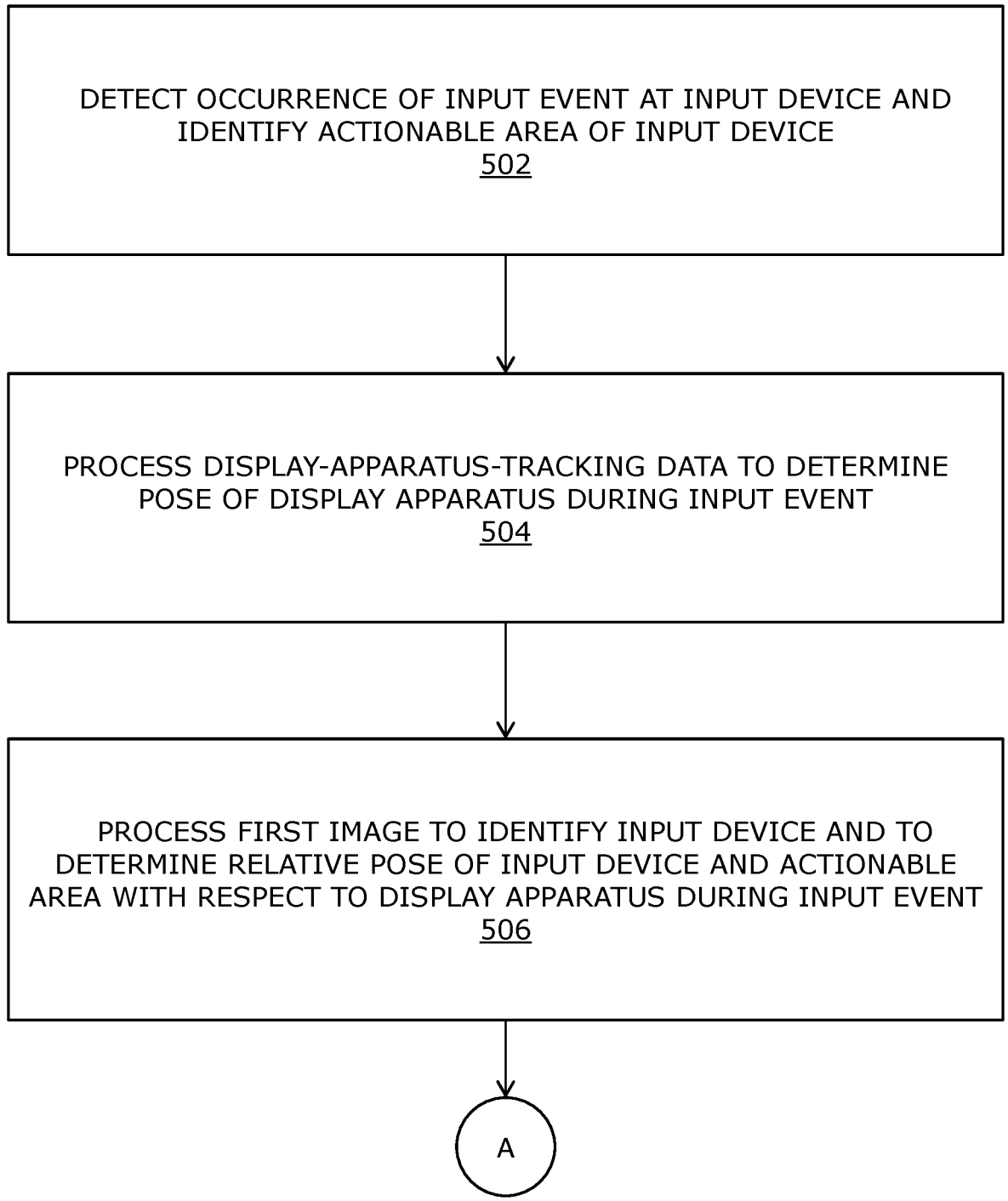
FIGS. 5A-5C illustrate steps of a method, in accordance with an embodiment of the present disclosure.
Figure 5B:
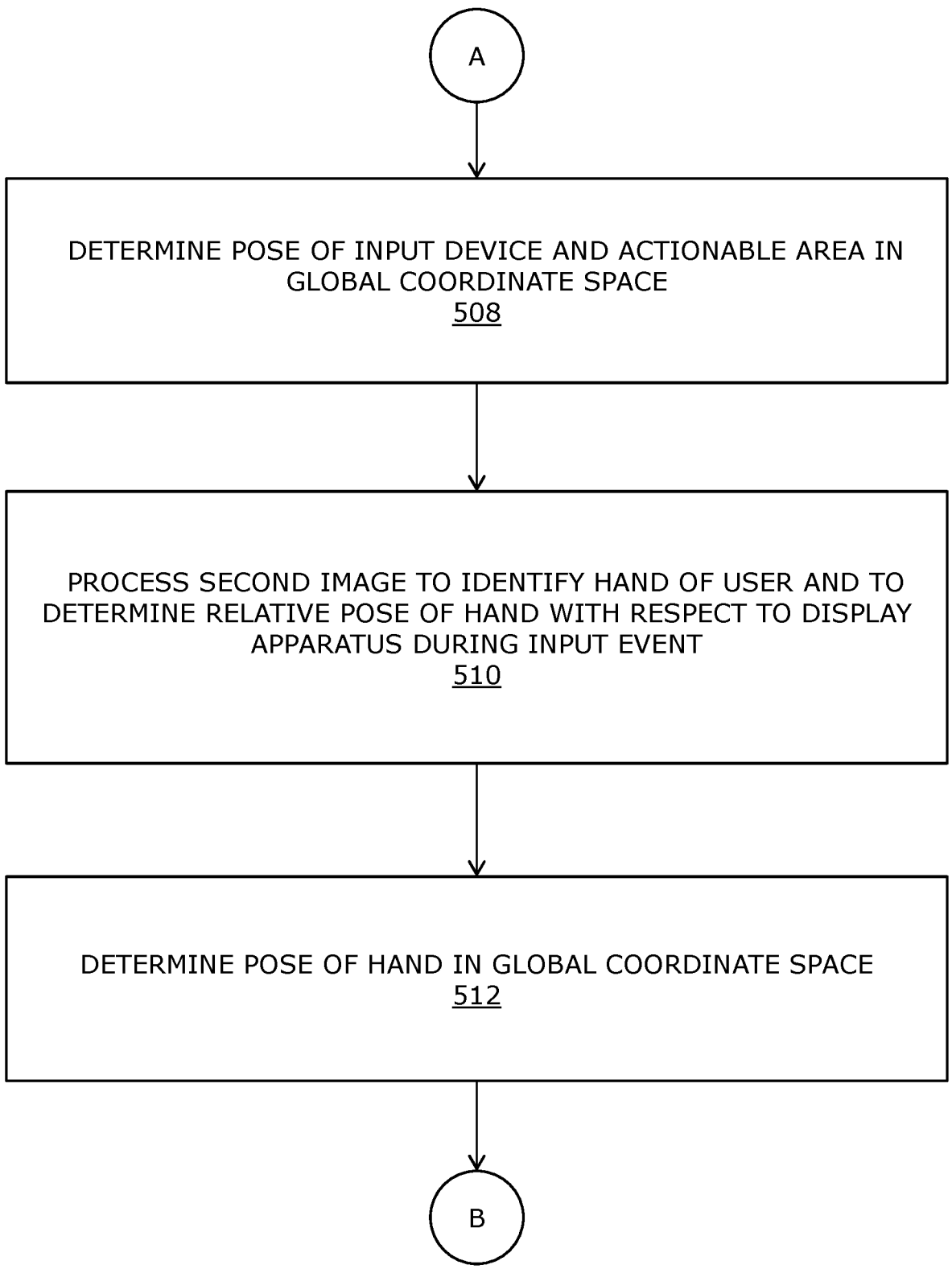
Figure 5C:
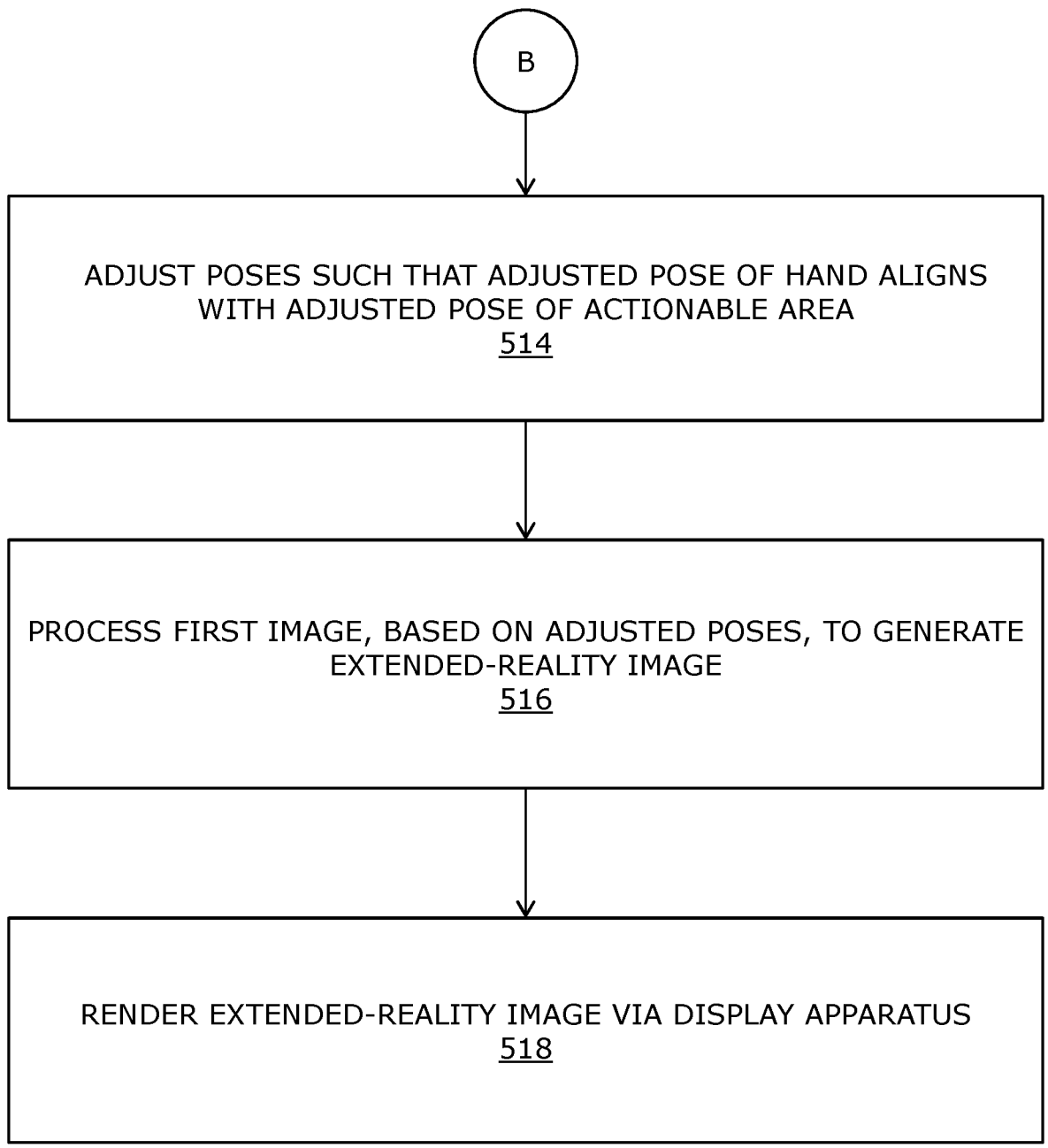

Referring to FIG. 5, illustrated are steps of a method, in accordance with an embodiment of the present disclosure. At step 502, an occurrence of a given input event at a given input device associated with a display apparatus is detected and an actionable area of the given input device using which a user provided an input pertaining to the given input event is identified. At step 504, display-apparatus-tracking data is processed to determine a pose of the display apparatus during the given input event, wherein the pose of the display apparatus is determined in a global coordinate space. At step 506, at least one first image of a real-world environment is processed to identify the given input device in the real-world environment and to determine a relative pose of the given input device and the identified actionable area with respect to the display apparatus during the given input event.

At step 508, a pose of the given input device and the identified actionable area during the given input event is determined in the global coordinate space, based on the relative pose of the given input device and the identified actionable area with respect to the display apparatus and the pose of the display apparatus during the given input event. At step 510, at least one second image of the real-world environment is processed to identify a hand of the user and to determine a relative pose of the hand with respect to the display apparatus during the given input event. At step 512, a pose of the hand during the given input event is determined in the global coordinate space, based on the relative pose of the hand with respect to the display apparatus and the pose of the display apparatus during the given input event.

At step 514, the pose of the given input device and the identified actionable area and the pose of the hand are adjusted in a manner that the adjusted pose of the hand aligns with the adjusted pose of the identified actionable area. At step 516, the at least one first image is processed, based on the adjusted pose of the given input device and the identified actionable area and the adjusted pose of the hand, to generate at least one extended-reality image in which a virtual representation of the hand is superimposed over a virtual representation of the identified actionable area of the given input device. At step 518, the at least one extended-reality image is rendered via the display apparatus.

The steps 502 to 518 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display system comprising:
   a display apparatus comprising at least one image renderer and at least one camera;
   display-apparatus-tracking means;
   at least one input device associated with the display apparatus; and
   at least one processor configured to:
   detect an occurrence of a given input event at a given input device and identify an actionable area of the given input device at which a user provided an input pertaining to the given input event;
   process display-apparatus-tracking data, obtained from the display-apparatus-tracking means, to determine a pose of the display apparatus during the given input event, wherein the pose of the display apparatus is determined in a global coordinate space;
   process at least one first image of a real-world environment, captured by the at least one camera positioned at an origin of a first coordinate space, to identify the given input device in the real-world environment and to determine a relative pose of the given input device and the identified actionable area with respect to the display apparatus in the first coordinate space during the given input event;
   determine a pose of the given input device and the identified actionable area during the given input event in the global coordinate space, based on the relative pose of the given input device and the identified actionable area with respect to the display apparatus and the pose of the display apparatus in the first coordinate space during the given input event;
   process at least one second image of the real-world environment, captured by the at least one camera positioned at an origin of a second coordinate space, to identify a hand of the user and to determine a relative pose of the hand with respect to the display apparatus in the second coordinate space during the given input event;
   determine a pose of the hand during the given input event in the global coordinate space, based on the relative pose of the hand with respect to the display apparatus and the pose of the display apparatus in the second coordinate space during the given input event;
   adjust the pose of the given input device and the identified actionable area in the global coordinate space, and the pose of the hand in the global coordinate space, in a manner that the adjusted pose of the hand aligns with the adjusted pose of the identified actionable area in the global coordinate space;
   process the at least one first image, based on the adjusted pose of the given input device and the identified actionable area and the adjusted pose of the hand, to generate at least one extended-reality image in which a virtual representation of the hand is superimposed over a virtual representation of the identified actionable area of the given input device; and
   render the at least one extended-reality image via the at least one image renderer of the display apparatus.

2. The display system of claim 1, wherein the at least one processor is configured to:
   determine an input-device-tracking quality with which the relative pose of the given input device with respect to the display apparatus is determined from the at least one first image; and
   determine a hand-tracking quality with which the relative pose of the hand with respect to the display apparatus is determined from the at least one second image, wherein the at least one processor is configured to adjust the pose of the given input device and the identified actionable area and the pose of the hand, based on the input-device-tracking quality and the hand-tracking quality.

3. The display system of claim 1, wherein the at least one processor is configured to:
   determine a quality of the display-apparatus-tracking data; and
   calibrate the display-apparatus-tracking means based on the determined quality.

4. The display system of claim 1, wherein the at least one processor is configured to:
   identify a first image segment of the at least one first image that represents the given input device; and
   determine a location of the actionable area of the given input device in the first image segment,
   wherein, when generating the at least one extended-reality image, the at least one processor is configured to replace the first image segment with a virtual representation of the given input device, wherein the identified actionable area of the given input device is represented virtually in the virtual representation of the given input device based on the location of the actionable area in the first image segment.

5. The display system of claim 4, wherein the at least one processor is configured to:
   identify a second image segment of the at least one first image that represents the user's hand; and
   process the second image segment and/or the at least one second image to identify a hand gesture of the user's hand,
   wherein, when generating the at least one extended-reality image, the at least one processor is configured to replace the second image segment with a virtual representation of the user's hand performing the identified hand gesture.

6. The display system of claim 1, wherein the at least one processor is configured to:
   generate a depth map indicative of an optical depth of objects present in the real-world environment with respect to the display apparatus during the given input event, the objects comprising the given input device, the identified actionable area and the user's hand; and
   utilize the depth map when determining the relative pose of the given input device and the identified actionable area and the relative pose of the user's hand with respect to the display apparatus during the given input event.

7. The display system of claim 6, wherein the at least one first image comprises a pair of stereo images, and wherein, when generating the depth map, the at least one processor is configured to match pixels of the pair of stereo images that represent a given three-dimensional point in the real-world environment and determine binocular disparities between matching pixels of the pair of stereo images.

8. The display system of claim 6, wherein the at least one camera comprises a depth camera, the at least one second image comprising a depth image of the real-world environment, wherein the at least one processor is configured to utilize the depth image when generating the depth map.

9. The display system of claim 1, further comprising input-device-tracking means, wherein the at least one processor is configured to:
process input-device-tracking data, obtained from the input-device-tracking means, to determine an additional pose of the given input device during the given input event, wherein the additional pose of the given input device is determined in an additional coordinate space;
convert the additional pose of the given input device from the additional coordinate space to the global coordinate space; and
adjust the pose of the given input device and the identified actionable area based on a difference between the converted additional pose of the given input device and the pose of the given input device.

10. A method comprising:
detecting an occurrence of a given input event at a given input device associated with a display apparatus and identifying an actionable area of the given input device at which a user provided an input pertaining to the given input event;
processing display-apparatus-tracking data to determine a pose of the display apparatus during the given input event, wherein the pose of the display apparatus is determined in a global coordinate space;
processing at least one first image of a real-world environment captured from an origin of a first coordinate space, to identify the given input device in the real-world environment and to determine a relative pose of the given input device and the identified actionable area with respect to the display apparatus in the first coordinate space during the given input event;
determining a pose of the given input device and the identified actionable area during the given input event in the global coordinate space, based on the relative pose of the given input device and the identified actionable area with respect to the display apparatus and the pose of the display apparatus in the first coordinate space during the given input event;
processing at least one second image of the real-world environment captured from an origin of a second coordinate space to identify a hand of the user and to determine a relative pose of the hand with respect to the display apparatus in the second coordinate space during the given input event;
determining a pose of the hand during the given input event in the global coordinate space, based on the relative pose of the hand with respect to the display apparatus and the pose of the display apparatus during the given input event;
adjusting the pose of the given input device and the identified actionable area in the global coordinate space, and the pose of the hand in the global coordinate space, in a manner that the adjusted pose of the hand aligns with the adjusted pose of the identified actionable area in the global coordinate space;
processing the at least one first image, based on the adjusted pose of the given input device and the identified actionable area and the adjusted pose of the hand, to generate at least one extended-reality image in which a virtual representation of the hand is superimposed over a virtual representation of the identified actionable area of the given input device; and
rendering the at least one extended-reality image via the display apparatus.

11. The method of claim 10, further comprising:
determining an input-device-tracking quality with which the relative pose of the given input device with respect to the display apparatus is determined from the at least one first image; and
determining a hand-tracking quality with which the relative pose of the hand with respect to the display apparatus is determined from the at least one second image,
wherein the step of adjusting the pose of the given input device and the identified actionable area and the pose of the hand is performed based on the input-device-tracking quality and the hand-tracking quality.

12. The method of claim 10, further comprising:
determining a quality of the display-apparatus-tracking data; and
calibrating, based on the determined quality, display-apparatus-tracking means from which the display-apparatus-tracking data is obtained.

13. The method of claim 10, further comprising:
identifying a first image segment of the at least one first image that represents the given input device; and
determining a location of the actionable area of the given input device in the first image segment,
wherein the step of processing the at least one first image to generate the at least one extended-reality image comprises replacing the first image segment with a virtual representation of the given input device, wherein the identified actionable area of the given input device is represented virtually in the virtual representation of the given input device based on the location of the actionable area in the first image segment.

14. The method of claim 13, further comprising:
identifying a second image segment of the at least one first image that represents the user's hand; and
processing the second image segment and/or the at least one second image to identify a hand gesture of the user's hand,
wherein the step of processing the at least one first image to generate the at least one extended-reality image comprises replacing the second image segment with a virtual representation of the user's hand performing the identified hand gesture.

15. The method of claim 10, further comprising:
generating a depth map indicative of an optical depth of objects present in the real-world environment with respect to the display apparatus during the given input event, the objects comprising the given input device, the identified actionable area and the user's hand; and
utilizing the depth map when determining the relative pose of the given input device and the identified actionable area and the relative pose of the user's hand with respect to the display apparatus during the given input event.

16. The method of claim 15, wherein the at least one first image comprises a pair of stereo images, and wherein the step of generating the depth map comprises matching pixels of the pair of stereo images that represent a given three-dimensional point in the real-world environment and determining binocular disparities between matching pixels of the pair of stereo images.

17. The method of claim 15, wherein the at least one second image comprises a depth image of the real-world environment, the method further comprising utilizing the depth image when generating the depth map.

18. The method of claim 10, further comprising:
- processing input-device-tracking data to determine an additional pose of the given input device during the given input event, wherein the additional pose of the given input device is determined in an additional coordinate space;
- converting the additional pose of the given input device from the additional coordinate space to the global coordinate space; and
- adjusting the pose of the given input device and the identified actionable area based on a difference between the converted additional pose of the given input device and the pose of the given input device.

* * * * *